United States Patent [19]

Kolsky et al.

[11] 4,283,457
[45] Aug. 11, 1981

[54] LAMINATE STRUCTURES FOR ACOUSTICAL APPLICATIONS AND METHOD OF MAKING THEM

[75] Inventors: Rodger E. Kolsky, Schenectady; Raymond Z. Naar, Delmar, both of N.Y.

[73] Assignee: Huyck Corporation, Wake Forest, N.C.

[21] Appl. No.: 91,601

[22] Filed: Nov. 5, 1979

[51] Int. Cl.³ .................... B32B 5/06; B32B 5/20; B32B 5/26; E04B 1/82
[52] U.S. Cl. .................... 428/285; 156/148; 181/288; 181/290; 181/294; 428/300; 428/301; 428/313
[58] Field of Search ............. 156/148; 428/134, 235, 428/300, 301, 428, 311, 313, 315, 284, 285; 181/284, 286, 288, 290, 294, DIG. 1

[56] References Cited

U.S. PATENT DOCUMENTS

| | | | |
|---|---|---|---|
| 1,442,328 | 1/1923 | De Long | 428/235 |
| 2,034,588 | 3/1936 | McMillan | 428/196 |
| 2,794,759 | 6/1957 | Dildilian | 428/300 |
| 3,253,947 | 5/1966 | McCluer et al. | 181/290 |
| 3,265,154 | 8/1966 | March | 181/290 |
| 3,276,928 | 10/1966 | Pearson et al. | 181/294 |
| 3,328,086 | 6/1967 | Johnston | 181/294 |
| 3,448,823 | 6/1969 | Smith | 428/228 |
| 3,451,885 | 6/1969 | Klein | 428/235 |
| 3,484,335 | 12/1969 | Wismer et al. | 428/312 |
| 3,542,638 | 11/1970 | Kenny | 428/315 |
| 3,583,522 | 6/1971 | Rohweder et al. | 181/290 |
| 3,712,846 | 1/1973 | Daniels et al. | 428/301 |
| 3,919,444 | 11/1975 | Shayman | 428/315 |
| 3,926,700 | 12/1975 | Hopkins, Jr. et al. | 156/148 |
| 4,007,071 | 2/1977 | Addie et al. | 428/234 |
| 4,056,161 | 11/1977 | Allen, Jr. | 181/294 |
| 4,070,519 | 1/1978 | Lefkowitz et al. | 428/235 |
| 4,077,491 | 3/1978 | Hankel | 181/290 |
| 4,111,081 | 9/1978 | Hilliard et al. | 428/116 |
| 4,113,535 | 9/1978 | Lefkowitz et al. | 428/234 |
| 4,201,247 | 5/1980 | Shannon | 428/284 |

*Primary Examiner*—William J. Van Balen
*Attorney, Agent, or Firm*—Frost & Jacobs

[57] ABSTRACT

A laminate structure for acoustical applications which comprises a porous, flexible, non-woven, needle punched mat of inherently non-burning, fine glass or other material fibers affixed as a facing to a sound absorbing, flame retardant, flexible backing such as a layer of open cell foam or a mat of glass or mineral fibers. The invention also contemplates the method of manufacture of such a laminate structure. Depending upon the materials used therefor, the facing and the backing may be joined together by needle punching and subsequent chemical bonding, chemical bonding, flame bonding and, in the case of an open cell foam backing, the backing may be foamed in place on the facing forming an intimate bond therewith.

26 Claims, 4 Drawing Figures

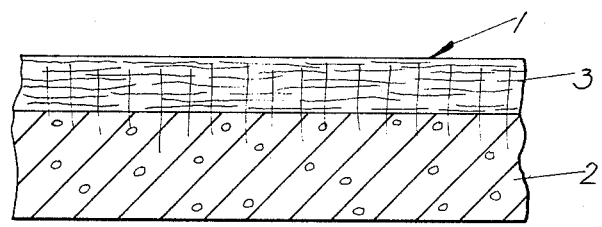
Фиг. 1
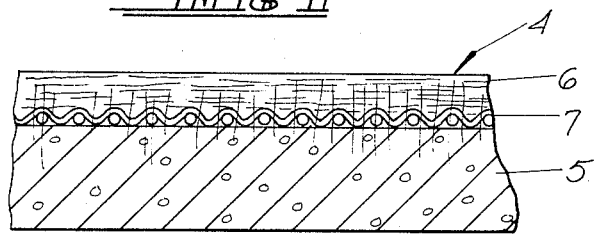
Фиг. 2
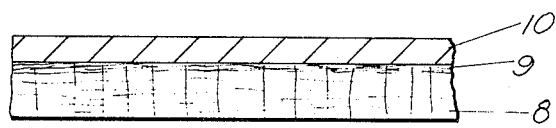
Фиг. 3
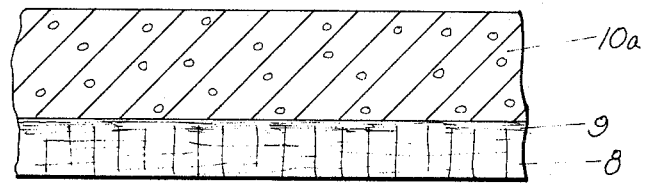
Фиг. 4

LAMINATE STRUCTURES FOR ACOUSTICAL APPLICATIONS AND METHOD OF MAKING THEM

TECHNICAL FIELD

The invention relates to laminate structures for acoustical applications and their method of manufacture, and more particularly to such laminate structures comprising a sound absorbing, flame retardant fiber mat or open cell foam backing provided with a facing in the form of a non-woven, needle punched mat of inherently non-burning, fine fibers.

BACKGROUND ART

The acoustical laminate of the present invention has many applications as decorative and functional covering for the walls and ceilings of offices and institutions such as banks, hotel lobbies, schools, hospitals and the like. The laminate structures may also be advantageously used on the ceiling and walls of entertainment areas such as concert halls, theater, nightclubs, etc. They may also be used as inside surface coverings for transportation vehicles such as trains, planes and buses. The laminate structures have further applications in the manufacture of divider screens for office space, acoustical louvers for windows and the like.

While not intended to be so limited, the laminate structures of the present invention will be described in terms of their application to the walls of office spaces. In recent years office architects have turned more and more to the open plan office comprising a large interior area having no interior walls or a minimum of such walls. The open plan office offers a number of advantages over conventional walled offices including improved communication at all levels, improved flexibility (employees being movable more easily and rapidly at less cost of relocation) and improved environment resulting in improved moral and productivity of the employees. In a typical approach to the open plan office, the "landscaping" is accomplished with individual pieces of functional, easily movable furniture and movable acoustical privacy screens.

Properly planned open office landscaping yields an office area which is functional and visually open while providing the acoustical privacy required by the employees to accomplish their tasks comfortably and efficiently. Five major components contribute to the necessary acoustical balance. These components are: carpet, masking sound, divider screens, ceiling and walls. The primary function of carpeting on the floors is to reduce traffic noise, rather than to absorb sound. It is common practice to provide an electronically generated masking sound emanating from speakers above the ceiling. The purpose of the masking sound is to interfere with speach intelligibility across the divider screens. The sound itself is virtually undetectable, but is ever present in the total environment.

Divider screens constitute an essential part of the open office landscaping, filling the dual role of giving a degree of visual privacy, as well as absorbing sound and preventing its transmittance through to the next work area. The typical divider screen is about 5 and ½ feet wide, 4 and ½ high, double sided and goes close to the floor, being supported by protruding feet or the like.

The ceiling is of major importance since sound can be reflected by it at an angle and thus travel from one work area to another. The usual approach is to apply sound absorbing panels to the ceiling or to suspend such panels by mechanical means.

In almost all open plan offices, the walls require acoustic treatment. As a general rule, walls less than 65 feet apart require treatment to prevent sound reflection. Those further apart still require acoustic treatment for those people located adjacent the walls. Prior art workers have generally taken two approaches toward the acoustic treatment of walls. One is the use of carpet which, while decorative and relatively inexpensive, is not a very effective sound absorber. The other approach is to use acoustical wall panels. There are many sound absorbing materials currently available for architectural applications, such as glass batts, mineral boards, etc. some provided with facings of vinyl, woven glass fibers or the like. While prior art panels are often effective sound attenuators, they are frequently characterized by one or more problems such as rigidity (being nonconformable to preexisting irregular surfaces and coming in predetermined sizes), difficult to maintain, repair or seam, and the like. Exemplary sound attenuating panels are taught, in U.S. Pat. Nos. 4,056,161 and 4,077,491. Exemplary rigid panels are taught in U.S. Pat. Nos. 3,148,693; 3,265,154; 3,583,522 and 4,111,081. A flexible sound attenuating material is taught in U.S. Pat. No. 3,253,947. U.S. Pat. Nos. 3,448,823 and 3,919,444 teach acoustical panels having an outer surface of woven glass fibers.

The two most important properties of an acoustical laminate are good sound absorption and excellent flame retardance. Sound absorption is a measure of how much sound energy impinging upon an object is absorbed by the object and how much is reflected back at different frequencies. A standard test for sound absorption is the ASTM C-423-77, Reverberation Room Method. The sound absorption value of a given material is expressed as N.R.C. (the Noise Reduction Coefficient). The N.R.C. is an arithmetic average of test values measured at 250, 500, 1,000 and 2,000 cps, to the nearest 0.05. Products currently available have a sound absorption value of 0.40 or better. Typically, for example, divider screens have an N.R.C. value of about 0.85. An acceptable sound absorbing wall covering or wall panel should have an N.R.C. value of at least from 0.40 to about 0.85. The major frequencies that are of concern in office areas are the 2,000–4,000 hertz band (speech range), in which range the N.R.C. of a good acoustical wall covering or wall panel should be at least about 0.80.

Flame retardance is extremely important in buildings, especially on vertical surfaces. The regulations vary from state-to-state and city-to-city. The most frequently specified test is the ASTM E-84-74 Tunnel Test. In this test a material is rated according to flame propagation, in Classes A (0–25), B (26–75), C (76–200) and D (201-). It is generally assumed that an acoustical wall covering should have a Class A rating to qualify for most applications.

The acoustical laminates of the present invention demonstrate excellent acoustical properties, achieving a N.R.C. value in excess of 0.80 in the range of 2,000 to 4,000 cps. While, as a general rule, composite acoustical materials usually demonstrate acoustical properties equal or worse than the acoustical properties of their individual parts, the laminates of the present invention demonstrate an unexpected synergism in that the acoustical properties of the laminates are considerably improved over the acoustical properties of the facing and the backing layers when tested alone. The non-wooven, needle punched, inherently non-flamable fibers (such as glass or mineral fibers) of the facing material yield very low smoke generation with the proper finish, are non-melting (resistant to cigarette burns and the like) and protect the foam or fiber mat backing so that the laminates achieve a flame retardant rating of A.

The non-woven, needle punched facing presents excellent aesthetic properties (look, texture, feel and the like). The facing material has a textile appearance and can be given a three dimensional surface (ribbed, quilted, etc.). The facing can be appropriately colored and imprinted or screenprinted with a design.

The laminates of the present invention can be readily cut or trimmed and since the facing is of non-woven, needle punched glass or mineral fibers or the like, there is less tendency for the edges of the facing to fray than with woven materials. This, together with the fact that the facing has a nonuniform geometry, due to inherent random fiber placement and needle marks, results in the ability of the laminates of the present invention to be easily seamed with low visibility seams to achieve a monolithic wall appearance and to be easily repaired.

The non-woven needle punched fiber facing is characterized by excellent abrasion resistance. As a result, the laminates of the present invention are resistant to being rubbed and demonstrate excellent maintenance and cleanability characteristics without change of appearance. The laminates will hold thumb tacks and the like.

The laminates of the present invention are supplied as flexible wall coverings, provided in roll form. As a result, the laminates have an ability to conform to irregular surfaces and to make tight radius bends. In fact, they can be used as portable sound absorbent screens which can be deployed or rolled up, as needed. They are characterized by ease of handling and application or installation with conventional tools. Because of their flexible form, they can be applied to an existing surface with wall paper paste or the like, or attached to an existing surface by means of a pressure sensitive adhesive applied to the rear surface of the laminates.

Finally, the acoustical laminates of the present invention can have their sound absorption efficiently increased by the addition of high surface area fillers in the facing layer.

DISCLOSURE OF THE INVENTION

According to the invention there is provided laminate structures for acoustical applications and methods of making them. In general, the laminates each comprise a porous, flexible, nonwoven, needle punched mat of inherently non-burning, fine fibers affixed as a facing to a sound absorbing, flame retardant backing. The backing may comprise a layer of open cell foam or a mat of glass or mineral fibers.

In a first embodiment of the present invention, the acoustical laminate comprises a backing layer in the form of a flexible and rollable nonwoven batt of glass fibers or other fibers preferably inherently non-flammable or flame retardant, or a layer of flame retardant open cell foam. The facing layer comprises a nonwoven mat of glass fibers or other flame retardant mineral fibers. The fiber mat is laid upon the backing and needle punched thereto. The laminate is subsequently treated with a fire resistant resin to improve its integrity and impart abrasion resistance.

In a second embodiment of the invention, the backing comprises a flexible flame retardant open cell foam or a mineral fiber batt. The facing layer comprises a needle punched, porous mat of glass or other flame retardant mineral fibers or such a mat needled punched into a flame retardent scrim or woven fabric to form a reinforced batt both examples being impregnated with a resin binder for integrity. The above described mat or batt facing layer is attached to the open cell foam backing layer by chemical bonding or flame bonding or to the mineral fiber batt by chemical bonding.

In yet another embodiment of the acoustical laminate of the present invention, the facing layer comprises either a needled, porous, mat of flame retardent glass or mineral fibers or a porous mat of flame retardent glass or mineral fibers or the like needle punched into a scrim or woven fabric of flame retardent fibers, again such as glass or the like, both examples impregnated with a binder for integrity. A foamable polymer is cast upon the facing layer and is subsequently blown into an open cell foam, thereby forming an intimate bond between the facing layer and the foam. This foaming-inplace procedure results in an integral foam-fiber laminate.

In all of the embodiments described above, the fibers used to form the porous, needled facing layer should have a fiber diameter of from about 2 to about 8 microns. In all of the embodiments outlined above, the backing layer may be formed as a rigid backing layer through the use of proper additives to the foam or fibrous batt backing layer. Preferably, however, the backing layer as well as the facing layer is flexible so that the acoustical laminate can be provided in roll form and so that it can be applied in a manner similar to wall paper to irregular surfaces, being bendable in tight radius bends and the like.

BRIEF DESCRIPTION OF THE DRAWINGS

FIG. 1 is a semi-diagrammatic cross sectional view of a first embodiment of the laminate structure for acoustical applications of the present invention.

FIG. 2 is a semi-diagrammatic cross sectional view of a second embodiment of the laminate structure of the present invention.

FIGS. 3 and 4 are semi-diagrammatic cross sectional views of yet another embodiment of the present invention, FIG. 3 showing the foamable backing prior to blowing and FIG. 4 showing the backing after blowing.

BEST MODE OF CARRYING OUT THE INVENTION

A first embodiment of the present invention is semi-diagrammatically illustrated in FIG. 1. The acoustical laminate is generally indicated at 1 and comprises a backing layer 2 and a facing layer 3. The backing layer 2 may constitute any appropriate sound absorbing material, preferably flame retardant, such as a glass or mineral fiber batt, or the like. Preferably, the backing layer 2 comprises a layer of sound absorbing, flame retardant, open cell foam. Foams are available in varying thickness, densities and pour sizes, reticulated to absorb sound waves of varying frequency. The foam can be formed from a host of polymers such as urethane, nitrile, neoprene, vinyl, natural rubber, styrene butadiene rubber and the like.

The backing layer 2 can be a rigid layer so that the laminate 1 can be made in the form of rigid panels of predetermined size. Preferably, however, the backing layer 2 is a flexible layer so that the laminate 1 can be presented in roll form and can be applied to wall surfaces and the like in much the same manner as wall paper. Thus, an appropriate adhesive may be applied to the underside of backing layer 2 which is thereafter adhered to the surface to be covered, or the underside of backing layer 2 may be provided with a coating of pressure sensitive adhesive and an appropriate pealable and disposable cover layer for the pressure sensitive adhesive.

The facing layer 3 comprises a nonwoven, porous mat of glass or other mineral fibers which are inherently flame retardant. While the invention is not intended to be so limited, glass fibers are preferred. The fibers used should have a diameter of from about 2 to about 8 microns. Glass fibers falling within these diameter specifications are available under the names Beta Fiberglass and E-Glass; such products are available from Owens-Corning Fiberglass Corporation of Toledo, Ohio. The glass fiber mat 3 may be formed by carding and cross laying, air laying or other techniques well known in the art.

The porous, nonwoven fiber mat 3 is located on the front surface of backing layer 2 and is needled by any appropriate and well known needling technique. This needling accomplishes two purposes. First of all, it creates significant fiber orientation in the "Z" direction of the fibrous mat (i.e. in a direction through the mat thickness from surface to surface) so that the fibers of the mat are interlocked with each other increasing the integrity of facing layer 3. In addition, a substantial number of the glass mat fibers are driven into the adjacent surface of backing layer 2 mechanically joining the facing layer 3 and backing layer 2.

When the fibers of facing layer 3 are glass fibers of the type described above, it is important that the fiber mat 3 be treated with a lubricating agent. It is preferable that the mat also be treated with an anti-static agent or compound to reduce electrostatic and friction forces during the needling step.

The needling of such a glass fiber mat is taught in U.S. Pat. No. 4,070,519. As is indicated therein, a wide variety of lubricating agents or compounds are available for this purpose including silicones, aromatic and aliphatic polyglycolethers and the like. A wide range of antistatic agents or compounds are also available such as polyoxyethylene monostearate and polyoxyethylene monolaureate. An exemplary lubricant is sold by Emery Industries of Cincinnati, Ohio under the trade name Emerstat 7451. An anti-static material is also available from the same company sold under the trade name Emerstat 7450. The laminate 1 is subsequently additionally bonded by appropriate resin treatment to impart mechanical integrity and abrasion resistance. Any suitable low flammability polymer with adhesive properties can be used. Vinyl chloride, copolymers of vinyl chloride, vinylidene chloride copolymers and flame retardant acrylics are exemplary of such polymers.

A second embodiment of the present invention is illustrated in FIG. 2. In this embodiment, the laminate is generally indicated at 4 and comprises a backing layer 5 and a facing layer 6. The backing layer 5 comprises an open cell, flame retardant foam such as any of those enumerated above. Excellent results have been achieved with a polyurethane foam, for example. While the backing layer 5 may be a stiff panel, it is preferably flexible for the reasons set forth respect to the first embodiment.

The facing layer 6 may constitute a porous, nonwoven, mat of fibers of the type described with respect to facing layer 3. Again glass fibers of the type mentioned above are preferred. The fibrous mat 6 constitutes a needled mat which preferably has been subject to a resin treatment to increase the integrity of the mat. To accomplish this, the mat 6, prior to attachment to the backing layer 5 is immersed in a resin bath so as to assure a resin solids pick-up of from 5 to 40% of the total mat weight. Rather than by immersion of the mat, the resin may be applied by spraying or other well known techniques. Exemplary flame retardant resins suitable for this purpose are vinyl chlorides and copolymers, vinylidene chloride and copolymers, flame retardant acrylics, etc. The resin treated mat is dried and heated to cause curing of the resin.

Alternatively, the mat 6 may be needled punched into a scrim made up of flame retardant material or a woven or nonwoven fabric of flame retardant fibers so that the facing layer 6 constitutes a reinforced mat. For purposes of an exemplary showing, a woven reinforcement is shown at 7 in FIG. 2. The element 7 may also be considered as representing a scrim or a nonwoven reinforcement, as indicated above. Such a reinforced fibrous batt is taught in the above mentioned U.S. Pat. No. 4,070,519. As taught therein the fibrous mat is needled into the reinforcing layer 7 and is thereby mechanically attached thereto. The reinforced batt is thereafter resin treated, dried and cured, for additional bonding. When the mat 6 is provided with a scrim to form a scrim reinforced batt, the scrim may be made of glass or other flame retardant fibers.

To complete the laminate of FIG. 2, the backing layer 5 and facing layer 6 are bonded together by chemical bonding (i.e. resin bonding as described above) or flame bonding.

A third embodiment of the present invention is illustrated in FIGS. 3 and 4. Reference is first made to FIG. 3 wherein a porous, nonwoven, needled facing layer is indicated at 8. The facing layer 8 may comprise a nonwoven, needled mat of flame retardant fibers. The mat may be treated with a resin binder, if desired. Alternatively, the mat 8 may be of the type described with respect to FIG. 2, needled to and reinforced by a scrim or a woven or nonwoven fabric of flame retardent fibers. For purposes of an exemplary showing, in this instance a nonwoven reinforcement is illustrated at 9.

With the reinforcing layer 9 uppermost, the facing layer 8 has cast thereon a foamable polymer 10. The polymer can be any of those mentioned above. Thereafter, the polymer is blown into a foam, forming a backing layer 10a (as shown in FIG. 4) and at the same time forming an intimate bond between the backing layer 10a and the facing layer 8. This foam-in-place operation can be conducted as either a batch or a continuous manufacturing process. Again the backing layer 10a can be stiff but preferably is flexible.

Tests have shown that in the embodiments of the present invention, when the backing is made of an open cell foam material, the density of the foam material over a range of from about 1 to about 6 pounds per cubic foot results in little change of sound absorbency of the foam. Beyond a certain thickness the foam has little effect on sound absorbency with respect to the speech range of frequencies (2,000–4,000 cps.) When the laminate has a facing layer of fine fibers such as the glass fibers enumerated above, the fibers should be arranged in random orientation. Furthermore, the facing layer should provide a surface with three-dimensional character, rather than a flat surface for best sound absorbency.

In the embodiments of the present invention the facing layer preferably has a thickness of from about 1/16 inch to about ¼ inch and the backing layer preferably has a thickness of from about ⅛ inch to about 1 inch.

EXAMPLE

A laminate according to the present invention was made up comprising a backing layer and a facing layer. The backing layer constituted a ½ inch thick polyurethane foam manufactured by Scott Foam, Division of Scott Paper Company and sold under the mark Pyrell. The facing surface was a reinforced batt of of fine glass fibers made in accordance with the teachings of the above mentioned U.S. Pat. No. 4,070,519 and sold by Huyck Corporation of Wake Forest, N.C. under the mark HUYGLAS. This facing material comprises a nonwoven glass fiber batt (having a fiber diameter of from about 2 to about 8 microns) needled to a mineral fiber under layer and resin treated.

The facing layer was adhered to one side of the polyurethane foam backing layer by gluing.

The acoustical properties of the laminate were tested by Standard ASTM Method C-423-66 (Reverburation Room Test). An 8×9 foot sample was placed on the floor of a 470 cubic meter room. The room contained several large speakers, a microphone and a conical reflector on the wall near the ceiling. Sound was fed to the speakers in pulses and the time was measured for the sound to decay. This time was measured both for the room empty and for the room with the sample in place, the difference being taken and with a factor yielding an absorption coefficient. The sound absorption coefficients were computed at 125, 250, 500, 1,000, 2,000 and 4,000 cps. A layer of the Pyrell polyurethane foam and a layer of the HUYGLAS facing material were also tested alone in the same manner. The results are given in the Table below, corrected to the nearest 0.05. The Table also gives the N.R.C. value for each sample tested.

| | c.p.s. | | | | | | |
|---|---|---|---|---|---|---|---|
| | 125 | 250 | 500 | 1000 | 2000 | 4000 | N.R.C. |
| HUYGLAS | .05 | .00 | .06 | .125 | .150 | .25 | .08 |
| ½" Pyrell | .05 | .10 | .25 | .55 | .85 | .90 | .45 |
| HUYGLAS + ½" Pyrell | .20 | .35 | .45 | .90 | .95 | .80 | .66 |

It will be noted from the N.R.C. values given in the table above that HUYGLAS by itself is a poor sound absorber, but when coupled with the Pyrell, the composite yielded a N.R.C. value far better than the sum of the HUYGLAS and Pyrell N.R.C. values alone. This result is unexpected since composites generally demonstrate N.R.C. values less than, or at best equal to the sum of the N.R.C. values of its parts.

While not wishing to be bound by theory, it is believed that the above noted synergistic effect is due to the fineness of the fiber glass fibers and would not be present if courser synthetic fibers were used. It is believed that the synergistic effect is independent of the nature of the backing and occurs both with a backing of glass or mineral fibers or a backing of polymeric foam.

The facing layer of the embodiments of the present invention can be textured or embossed by using a thermoplastic binder such as vinyl chloride or the like which is dried on the layer. A heated patterned or embossed roll is caused to contact the thermoplastic binder on the surface of the facing layer and imprint thereon a design which would remain intact when the softened polymer hardens. A ribbed, quilted or other three-dimensional textured appearance can be generated by hot patterned rolls or platens coming into contact with the thermoplastic binder on the facing layer. This can also be accomplished through the use of jets of hot air, heated wheels or rollers, or other like, depending on the pattern desired.

The acoustical laminates of the present invention can have their sound absorption efficiency increased by the addition of high surface area fillers in the facing layer. Very fine glass fibers, talc, or the like can be added to the facing fibers via the application of binder. The talc or other fine particles is dispersed in the resin binder and applied to the needled face in the same manner the resin binder alone would be applied.

The facing layer of the acoustical laminates of the present invention can be screen printed prior to or after the resin is applied thereto and dried. Preferably, screen printing would be done with a combination of die and binder to make the print durable to abrasion. Similarly, color could be added to the facing layer as a part of the resin binder which gives the facing integrity. This is done when the binder is applied to the facing layer immediately after the final needling procedure.

In the usual procedure for the manufacture of divider screens, the screen is provided with a septum of hardboard or metal. To both sides of this septum, the laminate of the present invention is applied with its backing layer adjacent the septum.

Modifications may be made in the invention without deparing from the spirit of it.

We claim:

1. A laminate structure for acoustical applications comprising a facing layer and a backing layer, said facing layer comprising a porous non-woven, needle punched mat of inherently non-flammable, fine fibers chosen from the class consisting of glass and mineral fibers, said backing layer comprising a flame retardant layer chosen from the class consisting of a layer of open cell foam, a glass fiber batt and a mineral fiber batt, said facing and backing layers being bonded together.

2. The structure claimed in claim 1 wherein said fine fibers of said facing layer have a diameter of from about 2 to about 8 microns.

3. The structure claimed in claim 1 wherein said backing layer comprises an open cell foam layer formed from a polymer chosen from the class consisting of urethane, nitrile, neoprene, vinyl, natural rubber, and styrene butadiene rubber.

4. The structure claimed in claim 1 wherein said laminate structure is flexible and rollable.

5. The structure claimed in claim 1 wherein said facing layer is needle punched to said backing layer as well as being bonded thereto.

6. The structure claimed in claim 1 wherein said laminate is bonded by resin treatment with a low flammability polymer with adhesive properties.

7. The structure claimed in claim 1 wherein said facing layer is treated with a low flammability resin binder to increase its integrity and abrasion resistance.

8. The structure claimed in claim 1 wherein said fine fiber mat of said facing layer is needle punched to a reinforcing layer chosen from the class consisting of a glass fiber scrim and woven and non-woven fabrics of flame retardant fibers, the reinforced facing layer being treated with a low flammability resin binder for integrity and abrasion resistance.

9. The structure claimed in claim 3 wherein said backing layer comprises a foamed-in-place layer, being foamed directly on the back side of said facing layer to form an intimate bond therewith.

10. The structure claimed in claim 6 wherein said low flammability polymer is chosen from the class consisting of vinyl chloride, copolymers of vinyl chloride, vinylidene chloride copolymers and flame retardant acrylics.

11. The structure claimed in claim 7 including a high surface area filler dispersed in said resin binder.

12. The structure claimed in claim 7 including a pigment added to said resin binder.

13. The structure claimed in claim 7 wherein said resin binder is a thermoplastic binder, said facing layer having a surface texture imparted thereto by heated means, said texture being permanent upon the cooling of said thermoplastic resin binder.

14. The structure claimed in claim 8 wherein said backing layer comprises a foamed-in-place layer of open cell foam, said backing layer being foamed directly of said reinforcing layer of said facing layer to form an intimate bond therewith.

15. A method of making a laminate structure for acoustical applications comprising the steps of providing a facing layer comprising a porous, nonwoven mat of inherently non-flammable fine fibers chosen from the class consisting of glass fibers and mineral fibers, needle punching said facing layer, treating said facing layer with a low flammability resin binder, providing a backing layer comprising a flame retardant layer chosen from the class consisting of a layer of open cell foam, a glass fiber batt and a mineral fiber batt and adhering said facing layer to said backing layer.

16. The method claimed in claim 15 wherein said fine fibers of said facing layer have a diameter of from about 2 to about 8 microns.

17. The method claimed in claim 15 wherein said backing layer comprises an open cell foam layer formed from a polymer chosen from the class consisting of urethane, nitrile, neoprene, vinyl, natural rubber, and styrene butadiene rubber.

18. The method claimed in claim 15 wherein said laminate structure is flexible and rollable.

19. The method claimed in claim 15 including the step needle punching said facing layer to said backing layer.

20. The method claimed in claim 15 including the step of needle punching said fine fiber mat of said facing layer to a reinforcing layer chosen from the class consisting of a glass fiber scrim and woven and non-woven fabrics of flame retardant fibers, said reinforced facing layer being treated with said low flammability resin binder.

21. The method claimed in claim 15 wherein said resin binder is chosen from the class consisting of vinyl chloride, copolymers of vinyl chloride, vinylidene chloride copolymers and flame retardant acrylics.

22. The method claimed in claim 15 including the step of dispersing a high surface area filler in said resin binder.

23. The method claimed in claim 15 including the step of adding a pigment to said resin binder.

24. The method claimed in claim 15 wherein said resin binder comprises a thermoplastic resin and including the step of imparting a surface texture to said facing layer by heated means.

25. The method claimed in claim 17 including the step of foaming said backing layer in place directly on the back side of said facing layer to form an intimate bond therebetween 26. The method claimed in claim 20 wherein said backing layer is an open cell foam layer and including the step of foaming said backing layer in place directly on said reinforcing layer of said facing layer to form an intimate bond therebetween.

* * * * *